Patented Sept. 28, 1948

2,449,990

UNITED STATES PATENT OFFICE 2,449,990

BETA-ACYLOXY CARBOXYLIC ACID COMPOUNDS AND METHODS OF PREPARING THE SAME

Thomas L. Gresham and Jacob Eden Jansen, Akron, Ohio, assignors to The B. F. Goodrich Company, New York, N. Y., a corporation of New York No Drawing. Application October 5, 1945, Serial No. 620,658

12 Claims. (Cl. 260—488)

This invention relates to a method of preparing beta-acyloxy derivatives of carboxylic acids, particularly propionic acid, and to novel beta-acyloxy propionic acid compounds thereby obtained.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone), which has the formula

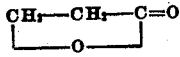

is economically obtained from ketene and formaldehyde.

We have now discovered that beta-propiolactone will react with salts of carboxylic acids, preferably while the reactants are dissolved in a polar solvent such as water, to produce salts of beta-acyloxy propionic acids which may then be converted into the free acids or their esters; that this reaction yields novel beta-acyloxy propionic acid compounds having unusual properties which render them useful in organic syntheses, in the rubber and plastics industries, as biologically and physiologically active agents and for a number of other purposes; and that other beta-lactones react similarly to produce numerous other useful beta-acyloxy carboxylic acids and their derivatives.

The reaction of beta-lactones with salts of carboxylic acids may be represented in general by the following equation:

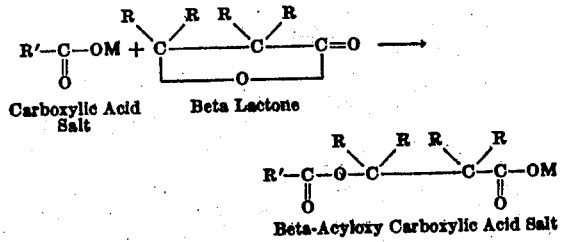

where R' is an organic radical, R is hydrogen or a substituent radical and M is a salt-forming cation such as a metallic ion, ammonium or the like. This reaction has been found to proceed quite readily without special conditions whenever it is possible to bring the reactants into effective contact with one another. Since carboxylic acid salts are not appreciably soluble in beta-lactones, bringing together of the reactants is ordinarily accomplished by the use of a solvent in which the salt will dissolve and ionize and which will also dissolve the lactone. Many beta-lactones and many carboxylic acid salts are soluble in water; hence the carrying out of the reaction in aqueous solution is by far the most convenient method of procedure, although in some instances it may be desirable to employ other polar solvents such as alcohols.

Despite the ease with which the reaction is effected, it is quite surprising that the reaction should occur at all, especially in aqueous solution, since beta-lactones react with water to form beta-hydroxy acids and are also known to polymerize in the presence of small amounts of certain salts.

Although the first-formed product of the reaction is a salt of a beta-acyloxy carboxylic acid, the corresponding free acid is obtained on acidification of the reaction product. The free acids in turn may be esterified, often directly from the reaction mixture, especially when utilizing a solvent for the reaction which is an alcohol. Thus the reaction leads to beta-acyloxy carboxylic acids, their esters and salts, all of which are characterized by possessing the

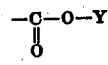

structure wherein Y is a positive radical which combines with hydroxyl, and are designated hereinafter collectively as beta-acyloxy carboxylic acid compounds.

As indicated by the general equation set forth hereinabove, the reaction involves one molecule of each the beta-lactone and the carboxylic acid salt. However, since the initial product of the reaction is itself a carboxylic acid salt (although containing a beta-acyloxy substituent), it may react with another molecule of beta-lactone to produce a higher molecular weight beta-acyloxy carboxylic acid salt of the formula

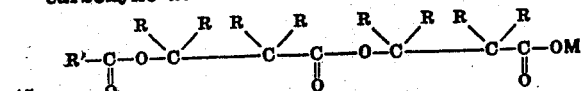

which in turn may react with still another molecule of beta-lactone, and hence by such a series of reactions compounds having any desired number of

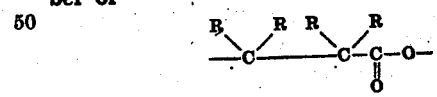

groups (those with a plurality of such groups being designated as beta-polyacyloxy carboxylic acid compounds when required to distinguish from the beta-monoacyloxy carboxylic acid compounds) may be produced. Accordingly, the product of reaction depends upon the relative quantity of lactone to carboxylic acid salt employed. When a beta-monoacyloxy carboxylic acid compound is the desired product substantially equimolecular proportions or an excess of the salt reactant say from 1 to 10 moles or more of salt, preferably from 2 to 5 moles, to each mole of beta-lactone, should be used. A molecular excess of beta-lactone (which may vary, for example, from 1 to 10 moles or more of beta-lactone to 1 mole of salt), on the other hand, yields a beta-polyacyloxy carboxylic acid compound either in substantially pure form or, as is more often the case, admixed with one or more compounds of the same nature and/or with some of the beta-monoacyloxy compound.

The practice of the invention may be illustrated by the following specific examples of preferred methods of carrying out the reaction and of representative novel compounds thereby obtained.

*Example I*

An aqueous solution of sodium acetate is prepared by dissolving 123 grams (1.5 moles) of sodium acetate in sufficient water to form 200 ml. of solution. 72 grams (63 ml.—.1 mole) of beta-propiolactone are then added to this solution over a period of 20 minutes with stirring of the solution and sufficient cooling to maintain the temperature at about 30° C. after which the solution is stirred for an additional 25 minutes at 30° C. The reaction mixture consists of a solution of the sodium salt of beta-acetoxy propionic acid, together with some dissolved sodium acetate and beta-propiolactone. From the reaction mixture, on acidification with hydrochloric acid, extraction with ether and careful vacuum distillation of the ether extract, a 59.2% yield of beta-acetoxy propionic acid, which is a liquid boiling with slight decomposition at 112–114° C. at 1 mm. and having an acid number and saponification number agreeing closely with the theoretical, is obtained. The beta-acetoxy propionic acid is useful for its biological activity and in the synthesis of other compounds.

*Example II*

Beta-propiolactone (1 mole) is added to one liter of an aqueous solution containing 4 moles of sodium acetate. The temperature of the solution at the start of the addition is about 30° C. and rises during the reaction, which requires about 45 minutes, to about 75° C. The reaction mixture is acidified and beta-acetoxy propionic acid, isolated as in Example I, is obtained in 74% yield. When the example is repeated using ammonium acetate instead of sodium acetate, about the same yield of the acid is secured.

*Example III*

One mole of beta-propiolactone and 1 mole of sodium acetate are reacted at 20° C. while the reactants are dissolved in 200 cc. of ethanol. The reaction mixture is acidified, refluxed for about 2 hours, and then poured into ice. As oil separates out which is extracted with ether and distilled. The ethyl ester of beta-acetoxy propionic acid B. P. 58–67°/4 mm. is thus obtained.

*Example IV*

A beta-polyacyloxy propionic acid is prepared by reacting 5 moles of beta-propiolactone with one mole of sodium acetate in the manner described in Example II. On acidification of the reaction solution, a product settles out of solution as a clear viscous oil. The oil consists, as shown by analysis, of a mixture of beta-(acetoxy-polypropionoxy) propionic acids of the formula

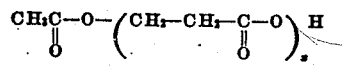

wherein $x$ is an integer having a value of 1 to 5, the average value for the specific mixture being about 3.2. The product, which is obtained in about 80% yield based on the sodium acetate, is a plasticizer for various resinous and rubbery materials.

*Example V*

Example IV is repeated except that the molecular ratio of beta-propiolactone to sodium acetate is increased to 10:1. The product in this instance is also an oily, water-insoluble, beta-acetoxy polypropionoxy propionic acid but its molecular weight is lower and it is obtained in lower yield than the product of Example IV, thus indicating that less of the beta-propiolactone reacts in the desired manner when its proportion to that of salt is increased to 10:1.

*Example VI*

To 1 mole of sodium caprate dissolved in water, 5 moles of beta-propiolactone are slowly added with stirring of the reaction solution and while maintaining the temperature of the solution at about 30 to 45° C. A solution of the sodium salt of a beta-caproxy-polypropionoxy propionic acid is thus obtained. On acidification of this solution, a clear oily liquid insoluble in water and consisting principally of beta-(caproxy-propionoxy-propionoxy) propionic acid

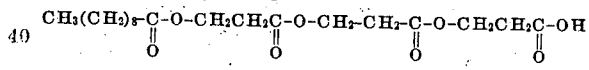

is produced in about 75% yield. The same product is also obtained in about the same yield when the temperature of the solution during the reaction is allowed to rise to 85° C.

*Example VII*

One mole of beta-propiolactone is added to an aqueous solution containing one mole of sodium laurate in the manner of the preceding examples. Acidification of the reaction mixture produces a clear oil which is separated from the solution and freed from water by azeotropic distillation with benzene. The oily product obtained in 58% yield is beta-lauryloxy propionic acid, the esters of which are particularly useful as plasticizers. Its alkali metal salts are useful as wetting and emulsifying agents.

*Example VIII*

A reaction between beta-propiolactone and disodium phthalate using 10 moles of the lactone (5 for each acid group) for each mole of the salt is carried out in the same manner as in the preceding examples, the reaction mixture acidified and the produce isolated. Analysis of the product shows it to consist of various di-(beta-carboxy ethyl) phthalates of the formula

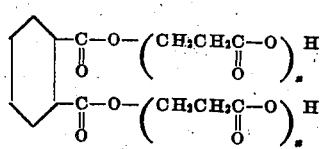

wherein $x$ is an integer having a value of 1 to 5, the average value for the specific product being 2.6. These phthalates and also those wherein the carboxy groups are also esterified, are members of the generic class of beta-acyloxy propionic acid compounds and may be used as plasticizers. When the same reaction is carried out using only 2 moles of beta-propiolactone a quantitative yield of di(beta-carboxyethyl) phthalate is obtained.

*Example IX*

Using the procedure of Example I, 1 mole of beta-propiolactone is reacted with 1 mole of sodium beta-chloro propionate. Beta (beta-chloro-propionoxy) propionic acid is obtained in high yield.

*Example X*

Again using the procedure of Example I, 1 mole of beta-propiolactone is reacted with 1 mole of the sodium salt of beta-cyano-propionic acid. Beta (beta-cyano-propionoxy) propionic acid, a solid melting at 142–145° C. and useful as a pesticide, is obtained.

The above examples demonstrate that the reaction between beta-lactones and carboxylic acid salts to form beta-acyloxy carboxylic acid compounds is not confined to any particular reaction conditions such as temperature, reaction medium or the like. Thus, they show that the temperature at which the reaction is effected is not critical and may be varied over a wide range. In general it is most convenient to work at temperatures varying from room temperature (about 25° C.) to about 100° C., as in the examples, since such temperatures are provided in the reaction medium by the heat of reaction and no heating or cooling is required. However, if desired, temperatures varying between the freezing point and boiling point of the solution of reactants (from about −20° C. to 120° C. when the solvent is water) may conveniently be used.

Although the reaction is preferably effected in aqueous solution Example III, which utilizes ethyl alcohol as the solvent, shows that this is not essential. Still other polar solvents which will dissolve the reactants may also be used. Examples of other polar solvents include other alcohols, organic nitriles, organic acids, nitro paraffins and the like.

Variations in the nature of the carboxylic acid salt reacted with the beta-lactone are also illustrated by the examples, and it is apparent that numerous other carboxylic acid salts are equivalent to those specifically used. The salts of any of the various carboxylic acids, including saturated and unsaturated, aliphatic and cyclic, mono- and poly-carboxylic acids such as acetic, propionic, butyric, isobutyric, caprylic, caproic, capric, lauric, palmitic, stearic and other fatty acids; acrylic, crotonic, oleic, linoleic and other unsaturated aliphatic acids; cyclohexanoic, furoic, benzoic, toluic, cinnamic, and other alicyclic, heterocyclic, and aromatic carboxylic acids; oxalic, succinic, adipic, sebacic, aconitic, maleic, phthalic and other polycarboxylic acids, may all be substituted one for another with generally equivalent results, it being of course necessary to take into account that in polycarboxylic acid salts each of the acid groups will react with the beta-lactone. In addition to salts of carboxylic acids in which the only function is carboxyl (acids made up of hydrocarbon structure and carboxyl groups), salts of carboxylic acids containing substituents such as halogen, nitro, oxy, hydroxy, thio, thiol, cyano, acyl, acyloxy, keto, amino, azo and the like may also be used as is illustrated by Examples IX and X. When substituent groups which contain a reactive hydrogen atom such as hydroxy, thiol, and amino are present the beta-lactone may also react with the substituent group thereby complicating the reaction; hence the use of salts of carboxylic acids in which all of the hydrogens except those attached to carbon are present in carboxyl groups is preferred.

Water-soluble salts of these acids, such as the alkali metal and ammonium salts, are preferably utilized since the reaction is preferably conducted in aqueous solution. The use of other metallic salts or organic salts of these acids, however, is also contemplated.

As has been mentioned hereinabove and illustrated in the examples, the beta-acyloxy propionic acid compounds prepared from carboxylic acid salts and beta-propiolactone are highly useful organic compounds. The free acids of the formula

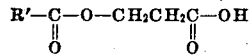

wherein R′ is an organic radical and their salts are intermediates for the preparation of other organic compounds and find application in the fields of medicine and in the chemical industries. When R is a high molecular weight hydrocarbon radical containing from 8 to 18 carbon atoms, the acids are plasticizers and softeners for cellulose derivatives, synthetic resins, synthetic rubber and other plastics. Beta-polyacyloxy carboxylic acids of the formula

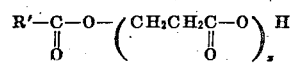

wherein R′ is an organic radical, preferably a hydrocarbon radical, and $x$ is a small integer say from 2 to 5, are useful for the same purposes. Salts of beta-acyloxy and beta-polyacyloxy acids containing 12 or more carbon atoms, such as those having an alkali metal or ammonium radical replacing the hydrogen of the carboxyl group are useful as wetting and emulsifying agents and for other purposes.

Esters of beta-acyloxy propionic acids with any alcohol are generally useful as plasticizers for cellulose derivatives, synthetic resins, rubbery materials and the like. Esters of beta-acyloxy acids of the formulae

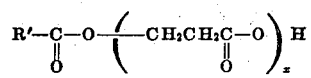

and

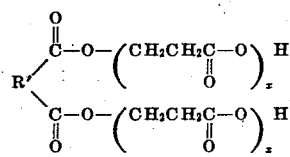

wherein R′ is a hydrocarbon radical and $x$ is an integer from 1 to 5, with alcohols containing from 8 to 18 carbon atoms such as 2-ethyl hexanol, lauryl alcohol, cetyl alcohol and the like are particularly useful as plasticizers for vinyl resins such as polyvinyl chloride. These latter esters may be prepared by the direct esterification, without any catalyst, of the acid by the alcohol. Lower esters of these acids such as those with ethyl or butyl alcohol are more difficult to prepare because of alcoholysis of the acyloxy acid splitting the acid at the ester linkage, but such esters may be secured as illustrated in Example III. The preparation of esters with lauryl alcohol, which is representative of 8 to 18 carbon atoms alcohols to yield plasticizers for vinyl resins is illustrated by the following examples.

Example XI

One mole of lauryl alcohol is mixed with one mole of beta-acetoxy propionic acid and heated at 100° C. for about 12 hours. The product is then distilled to remove unreacted alcohol and acid. A residue which consists of lauryl beta-acetoxy propionate is obtained.

Example XII

Example XI is repeated using the beta-caproxy-polypropionoxy acid obtained in Example VI instead of beta-acetoxy propionic acid. The lauryl ester obtained as the product is mixed with polyvinyl chloride and an excellent plasticized polyvinyl chloride composition is obtained.

Although the preparation of beta-acyloxy propionic acid compounds from salts of carboxylic acids and beta-propiolactone, as illustrated in Examples I to X, is preferred because of the utility of the compounds obtained and the low cost of beta-propiolactone, the homologs of beta-propiolactone, that is other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-butyl-beta-propiolactone, alpha-methyl-beta-butyrolactone, beta-methyl-beta-valerolactone and the like, may also be used to produce other beta-acyloxy carboxylic acid compounds. Similarly other lactones of beta-hydroxy monocarboxylic acids including those containing cycloalkyl, aryl and aralkyl substituents, such as beta-cyclohexyl-beta-propiolactone, beta-phenyl-beta-propiolactone, alpha-phenyl-beta-propiolactone, beta-benzyl-beta-propiolactone and the like may also be used. All of the above-mentioned beta-lactones are of the general structure

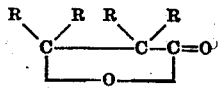

wherein R is hydrogen or an unreactive hydrocarbon group (i. e., a hydrocarbon group free from aliphatic unsaturation) and may be prepared in the manner described in the above-mentioned Küng patent. Still other beta-lactones are known and are also contemplated by this invention. Among these are beta-lactones of unsaturated beta-hydroxy carboxylic acids, monolactones of dicarboxylic acids and dilactones of dicarboxylic acids in which at least one of the lactones is beta. Examples of these lactones include alpha, alpha-dimethyl-beta-propiolactone-beta carboxylic acid; trimethyl-beta-propiolactone-beta-carboxylic acid; beta-beta-dimethyl-beta-propiolactone-alpha-carboxylic acid; and the beta-delta-dilactone of cityrlidene malonic acid, all of which, like the beta-lactones before mentioned, are, except for carbonoxy structure

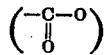

composed exclusively of hydrogen and carbon atoms. Still other beta-lactones contain, in addition to carbonoxy structure and hydrogen and carbon atoms, other elements such as oxygen, nitrogen, sulfur and halogen which may be present in essentially unreactive structure such as nitro groups and ether linkages or in radicals containing reactive hydrogen such as amino and hydroxy. Examples of such latter compounds are alpha or beta-nitrophenyl-beta-propiolactone; beta-(o-nitro-m-chlorophenyl)-beta-propiolactone; beta (o-nitro-m-methoxyphenyl)-beta-propiolactone; alpha - hydroxy - beta - phenyl - beta - propiolactone and alpha-bromo-beta-beta-dimethyl-beta-propiolactone-alpha-carboxylic acid.

In short any of the generic class of beta-lactones may be utilized in the method of this invention. Beta-lactones which are water-soluble are preferably used since the reaction is preferably effected in aqueous solution.

Numerous other variations and modifications in the procedure described herein will occur to those skilled in the art and are within the spirit and scope of the invention as defined in the appended claims.

We claim:

1. The method of preparing a salt of a beta-acyloxy carboxylic acid which comprises reacting in a polar solvent for the reactants selected from the class consisting of water and alcohol, a water-soluble unsubstituted saturated aliphatic beta-lactone with a water-soluble salt of a carboxylic acid containing hydrogen atoms present only in hydrocarbon and carboxyl groups.

2. The method of preparing a beta-acyloxy carboxylic acid which comprises reacting in aqueous solution a water-soluble unsubstituted saturated aliphatic beta-lactone with a water-soluble salt of a carboxylic acid containing hydrogen atoms present only in hydrocarbon and carboxyl groups, and then acidifying the solution.

3. The method of preparing a beta-acyloxy propionic acid which comprises reacting in aqueous solution beta-propiolactone and a water-soluble salt of a carboxylic acid containing hydrogen atoms present only in hydrocarbon and carboxyl groups and then acidifying the solution.

4. The method of preparing a beta-acyloxy propionic acid which comprises reacting in aqueous solution beta-propiolactone and a water-soluble salt of a carboxylic acid composed exclusively of hydrocarbon and carboxy groups and then acidifying the solution.

5. The method of preparing a beta-acyloxy propionic acid which comprises reacting in aqueous solution at a temperature of 25 to 100° C., beta-propiolactone and an alkali metal salt of a monocarboxylic acid composed of a carboxylic acid group linked to a hydrocarbon structure, and then acidifying the solution.

6. The method of preparing a beta-acyloxy propionic acid which comprises reacting in aqueous solution one mole of beta-propiolactone and from 1 to 5 moles of an alkali metal salt of a fatty acid, and then acidifying the solution.

7. The method of preparing beta-acetoxy propionic acid which comprises reacting in aqueous solution one mole of beta-propiolactone and from 1 to 5 moles of a water-soluble acetate, and then acidifying the solution.

8. The method of preparing a beta-(acyloxy-polypropionoxy) propionic acid which comprises reacting in aqueous solution from 1 to 10 moles of beta-propiolactone with 1 mole of a water-soluble salt of a carboxylic acid composed exclusively of hydrocarbon and carboxy groups, and then acidifying the solution.

9. The method of preparing a beta-(acyloxy-polypropionoxy) propionic acid which comprises reacting in aqueous solution from 1 to 5 moles of beta-propiolactone with 1 mole of an alkali metal salt of a fatty acid, and then acidifying the solution.

10. The method of preparing a beta-(caproxy-polypropionoxy) propionic acid which comprises reacting in aqueous solution from 1 to 5 moles of beta-propiolactone with 1 mole of an alkali metal caprate, and then acidifying the solution.

11. The method of preparing a beta-acyloxy propionic acid which comprises reacting in aqueous solution beta-propiolactone and a water-soluble salt of a polycarboxylic acid composed of carboxyl groups linked to hydrocarbon structure, and then acidifying the solution.

12. The method of preparing a di(-beta-carboxy-ethyl) phthalate which comprises reacting in aqueous solution beta-propiolactone and an alkali metal phthalate, and then acidifying the solution.

THOMAS L. GRESHAM.
JACOB EDEN JANSEN.

REFERENCES CITED

The following references are of record in the file of this patent:

UNITED STATES PATENTS

| Number | Name | Date |
|---|---|---|
| 2,120,755 | Kyrides (I) | June 14, 1938 |
| 2,120,756 | Kyrides (II) | June 14, 1938 |
| 2,122,716 | Graves | July 5, 1938 |
| 2,131,142 | Orthner, et al. | Sept. 27, 1938 |
| 2,361,036 | Kung | Oct. 24, 1944 |
| 2,371,245 | Lee, et al. | Mar. 13, 1945 |
| 2,371,281 | Claborn | Mar. 13, 1945 |

OTHER REFERENCES

Johansson "Universitas Lundensis Acta" (New Series—2nd AFD) vol 12 (1906) pp. 18, 19, 30, and 31.

Sherlin, et al., "Chem. Abstracts," vol. 32, pages 5398 (1938).

Certificate of Correction

September 28, 1948.

Patent No. 2,449,990.

THOMAS L. GRESHAM ET AL.

It is hereby certified that errors appear in the printed specification of the above numbered patent requiring correction as follows:

Column 3, line 29, for "(63 ml.—.1 mole)" read *(63 ml. —1 mole)*; column 4, line 66, for "produce" read *product*;

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*